United States Patent
Wild, III et al.

(10) Patent No.: US 7,440,415 B2
(45) Date of Patent: Oct. 21, 2008

(54) VIRTUAL NETWORK ADDRESSES

(75) Inventors: Aloysius Arthur Wild, III, Los Angeles, CA (US); Nick Ambrose, Los Angeles, CA (US)

(73) Assignee: IXIA, Calabasas, CA (US)

( * ) Notice: Subject to any disclaimer, the term of this patent is extended or adjusted under 35 U.S.C. 154(b) by 979 days.

(21) Appl. No.: 10/448,969

(22) Filed: May 30, 2003

(65) Prior Publication Data
US 2004/0240440 A1 Dec. 2, 2004

(51) Int. Cl.
H04L 12/28 (2006.01)
(52) U.S. Cl. ............ 370/254; 370/392; 370/400; 370/475; 709/222; 709/226; 709/245
(58) Field of Classification Search ........ None
See application file for complete search history.

(56) References Cited

U.S. PATENT DOCUMENTS

| | | | |
|---|---|---|---|
| 5,247,517 A | 9/1993 | Ross et al. | |
| 5,414,704 A | 5/1995 | Spinney | |
| 5,535,338 A * | 7/1996 | Krause et al. | 709/222 |
| 5,590,285 A | 12/1996 | Krause et al. | |
| 5,974,463 A | 10/1999 | Warrier et al. | |
| 6,122,670 A | 9/2000 | Bennett et al. | |
| 6,345,302 B1 | 2/2002 | Bennett et al. | |
| 6,381,227 B1 | 4/2002 | Fielding et al. | |
| 6,721,274 B2 | 4/2004 | Hale | |
| 7,152,119 B2 * | 12/2006 | Na et al. | 709/245 |
| 2001/0039590 A1 | 11/2001 | Furukawa et al. | |
| 2003/0069993 A1 | 4/2003 | Na et al. | |
| 2003/0202486 A1 | 10/2003 | Anton | |
| 2003/0231741 A1 | 12/2003 | Rancu et al. | |
| 2004/0001492 A1 | 1/2004 | Johnson | |
| 2004/0141468 A1 * | 7/2004 | Christensen et al. | 370/252 |

FOREIGN PATENT DOCUMENTS

WO WO 98/49620 11/1998

OTHER PUBLICATIONS

"Virtual Network Interface MIB"; Cisco MDS 9000 Family MIB Reference Guide, Release 1.0(1).
Alessandro, Rubini; "Gearheads Only: Virtual Network Interfaces;" Linux Magazine, Apr. 2000.
Spitzner, Lance; "Configuring Network Interface Cards;" Aug. 17, 1999.
McGill Univesity; "Virtual Private Network (VPN)".

(Continued)

*Primary Examiner*—Wing F. Chan
*Assistant Examiner*—Brian Roberts
(74) *Attorney, Agent, or Firm*—SoCal IP Law Group LLP; Steven C. Sereboff; Mark Andrew Goldstein (57) ABSTRACT

Systems, methods and devices for virtual network addresses. A method comprises processing a request from a requestor to create a plurality of software network devices having a corresponding plurality of media access control (MAC) addresses. The MAC addresses may be allocated to a network interface circuit. The MAC addresses and the software network devices may be provided to the requestor. Incoming data units may be received from a network via a driver and a demultiplexor. Outgoing data units may be sent on to the network via a driver.

31 Claims, 4 Drawing Sheets

OTHER PUBLICATIONS

"Network Stack Cloning/Virtualization Extensions to the Free BSD Kernel".

Zec, Marko, Implementing a Clonable Network Stack in the FreeBSD Kernel, Proceedings of the 2003 USENIX Annual Technical Conference, 2003.

Zec, M., et al., Estimating the Impact of Interrupt Coalescing Delays on Steady State TCP Throughput, Proceedings of the 10th SoftCOM 2002 conference, 2002.

Zec, M. and Mikuc, M., Real-Time IP Network Simulation at Gigabit Data Rates, Proceedings of the 7th Internation Conference on Telecommunications (ConTEL), Jun. 2003.

Zec, Marko, BSD Network Stack Virtualization, BSDCon Europe, Amsterdam, Nov. 2002.

Rubini, Alessandro, Gearheads Only:Virtual Interfaces, Linux Magazine, Apr. 2000.

European Search Report, EPO, Aug. 19, 2004, Y Lebas, Munich, App EP04253011.3.

\* cited by examiner

VIRTUAL NETWORK ADDRESSES

NOTICE OF COPYRIGHTS AND TRADE DRESS

A portion of this patent document contains material which is subject to copyright protection. This patent document may show and/or describe matter which is or may become trade dress of the owner. The copyright and trade dress owner has no objection to the reproduction by any one of the patent disclosure as it appears in the Patent and Trademark Office patent files or records, but otherwise reserves all copyright and trade dress rights.

BACKGROUND OF THE INVENTION

1. Field of the Invention

The invention relates to testing and analysis of communications networks, systems and devices, and, more specifically, to establishing and using virtual network addresses.

2. Description of Related Art

Networks such as the Internet provide a variety of data of all kinds which is communicated using a variety of network devices including servers, routers, hubs, switches, and other devices. Before placing a network into use, the network, including the network devices included therein are typically tested to ensure successful operation. Similarly, before placing a web site on the Internet, the web site and associated servers and other network devices may be tested to ensure that they function as intended and can withstand anticipated traffic demands.

To assist with the construction, installation and maintenance of networks and web sites, networks may be augmented with network analyzing devices, network monitoring devices, and network protocol conformance systems, all are referred to herein as network testing systems. The network testing systems may allow for the sending, capturing and analyzing of network communications.

One type of network testing system is the traffic generator. Traffic generators are used to originate simulated data on a live or test network. Some traffic generators are loaded with traffic patterns, and the traffic generator originates data on the network according to those patterns. Traffic generators may be used to test web sites and network communications devices, for example.

As used herein, a network capable device is any device that has the ability to communicate over a network. In many networks, network capable devices each have a media access control (MAC) address to identify the network capable device on the network. A computing device or other network capable device may include a network interface card (NIC) to access an Ethernet network. The NIC has a unique MAC address.

A MAC address is defined by industry standards as a hardware address that uniquely identifies the network capable device. In Ethernet and IEEE 802 standards, the MAC address includes six octets totaling 48 bits. The first three octets of the address are the manufacturer's Organizationally Unique Identifier (OUI). The OUI is assigned by the IEEE. The remaining three octets of the address uniquely identify the network capable device and are referred to as the organizationally unique address (OUA). The OUA is typically assigned by the manufacturer of the network capable device. MAC addresses are typically allocated when the network capable device is manufactured and may be stored in firmware.

In current network testing systems and cards included in network testing systems, each NIC has a single, unique MAC address.

DETAILED DESCRIPTION OF THE INVENTION

Throughout this description, the embodiments and examples shown should be considered as exemplars, rather than limitations on the apparatus and methods of the invention.

Systems of the Invention

Figure 1:
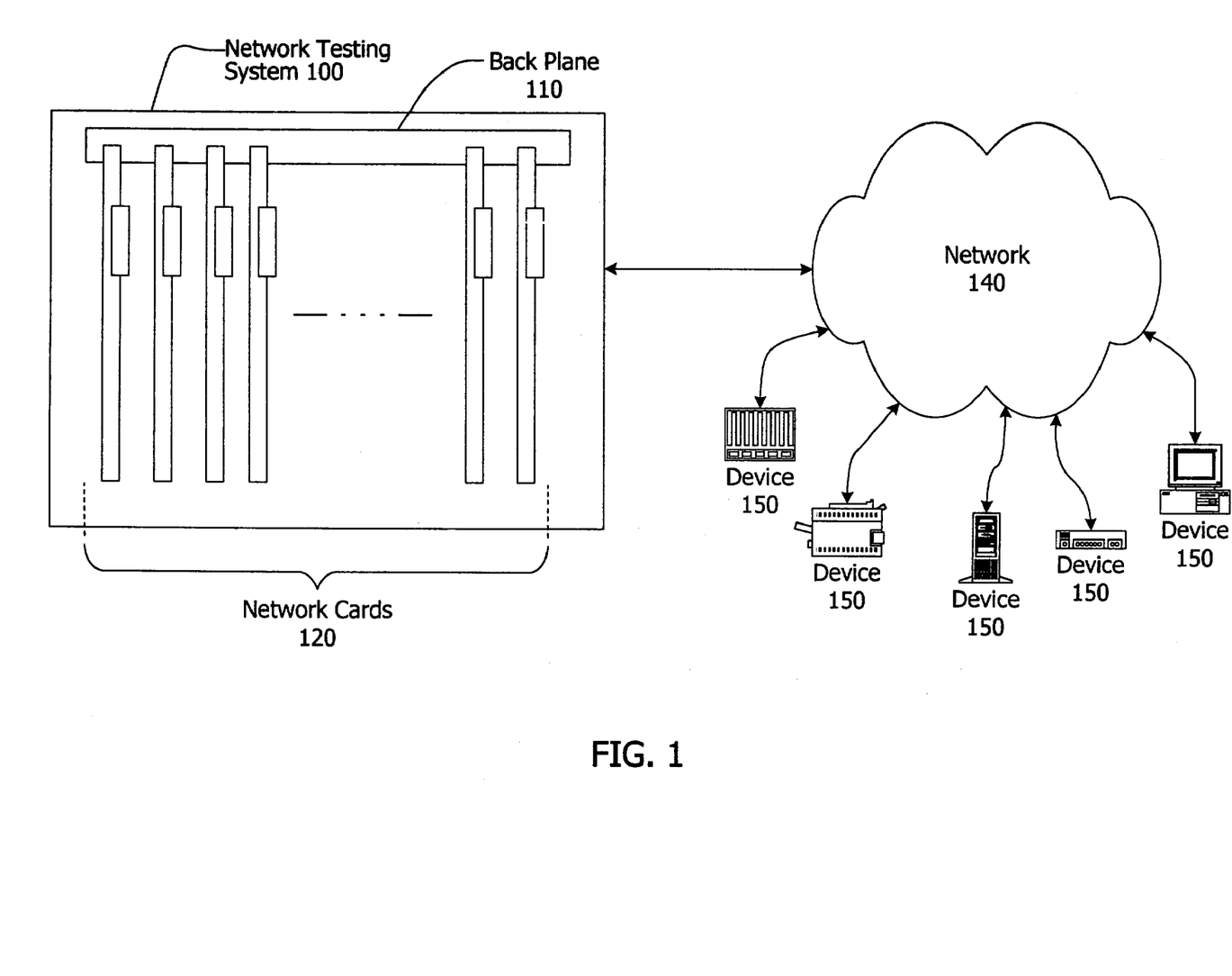
FIG. 1 is a block diagram of an environment in accordance with the invention.

Referring now to FIG. 1, there is shown a block diagram of an environment in accordance with the invention. The environment includes a network testing system 100, a network 140 and plural network capable devices 150.

The network testing system 100 may include or be one or more of a traffic generator, a performance analyzer, a conformance validation system, a network analyzer, and/or a network management system. The network testing system 100 may include one or more network cards 120 and a back plane 110. Network testing system 100 may be in the form of a card rack, as shown in FIG. 1, or may be an integrated unit. Alternatively, the network testing system may comprise a number of separate units cooperating to provide traffic generation and other tasks. The network testing system 100 and the network cards 120 may support one or more well known standards or protocols such as, for example, the 10 Gigabit Ethernet and Fibre Channel standards, may support proprietary protocols, and may support other protocols as well as one or more varieties of the IEEE 802 Ethernet standards, such as, for example, IEEE 802.3 and IEEE 802.11.

The network cards 120 may include one or more field programmable gate arrays (FPGA), application specific integrated circuits (ASIC), programmable logic devices (PLD), programmable logic arrays (PLA), processors and other kinds of devices. In addition, the network cards 120 may include software and firmware. The term network card encompasses line cards, test cards, analysis cards, network line cards, load modules, interface cards, network interface cards, data interface cards, packet engine cards, service cards, smart cards, switch cards, relay access cards, and others.

Each network card 120 may include one or more circuits, chips or chip sets that allow the network card 120 to serve as one or more network capable devices. A network capable device is any device that may communicate over network 140. In one embodiment, each network card 120 includes a circuit, chip or chipset and related hardware and software that allows the network card 120 to communicate over a network. The network cards 120 may be connected to the network through wire, optical fiber, wirelessly or otherwise. Each network card 120 may support a single communications protocol, may support a number of related protocols, or may support a number of unrelated protocols. The network cards 120 may be permanently installed in the network testing system 100, may be removable, or may be a combination thereof. As described in more detail below, each network card 120 may provide one or more virtual MAC addresses in addition to or in place of a single traditional MAC address. In this way each network card 120 may serve as more than one node or client on the network. Each network card 120 may include multiple MAC addresses and may emulate multiple virtual network interface cards (NICs) and/or multiple network capable devices.

The back plane 110 may serve as a bus or communications medium for the network cards 120. The back plane 110 may also provide power to the network cards 120.

The network capable devices 150 may be any devices capable of communicating over the network 140. The network capable devices 150 may be computing devices such as workstations, personal computers, servers, portable computers, personal digital assistants (PDAs), computing tablets, and the like; peripheral devices such as printers, scanners, facsimile machines and the like; network capable storage devices including disk drives such as network attached storage (NAS) and storage area network (SAN) devices; networking devices such as routers, relays, firewalls, hubs, switches, bridges, and multiplexers. In addition, the network capable devices 150 may include appliances such as refrigerators, washing machines, and the like as well as residential or commercial HVAC systems, alarm systems, telephones, and any other device or system capable of communicating over a network. The network capable devices 150 may be referred to as devices under test (DUTs).

The network 140 may be a local area network (LAN), a wide area network (WAN), a storage area network (SAN). The network 140 may be wired, wireless, or a combination of these, and may include or be the Internet. The network 140 may be public or private, and may be a segregated test network. Communications on the network 140 may take various forms, including frames, cells, datagrams, packets or other units of information, all of which are referred to herein as data units. The network testing system 100 and the network capable devices 150 may communicate simultaneously with one another, and there may be plural logical communications links between the network testing system 100 and a given network capable device 150. The network 140 may be comprised of numerous nodes providing numerous physical and logical paths for data to travel.

Figure 2:
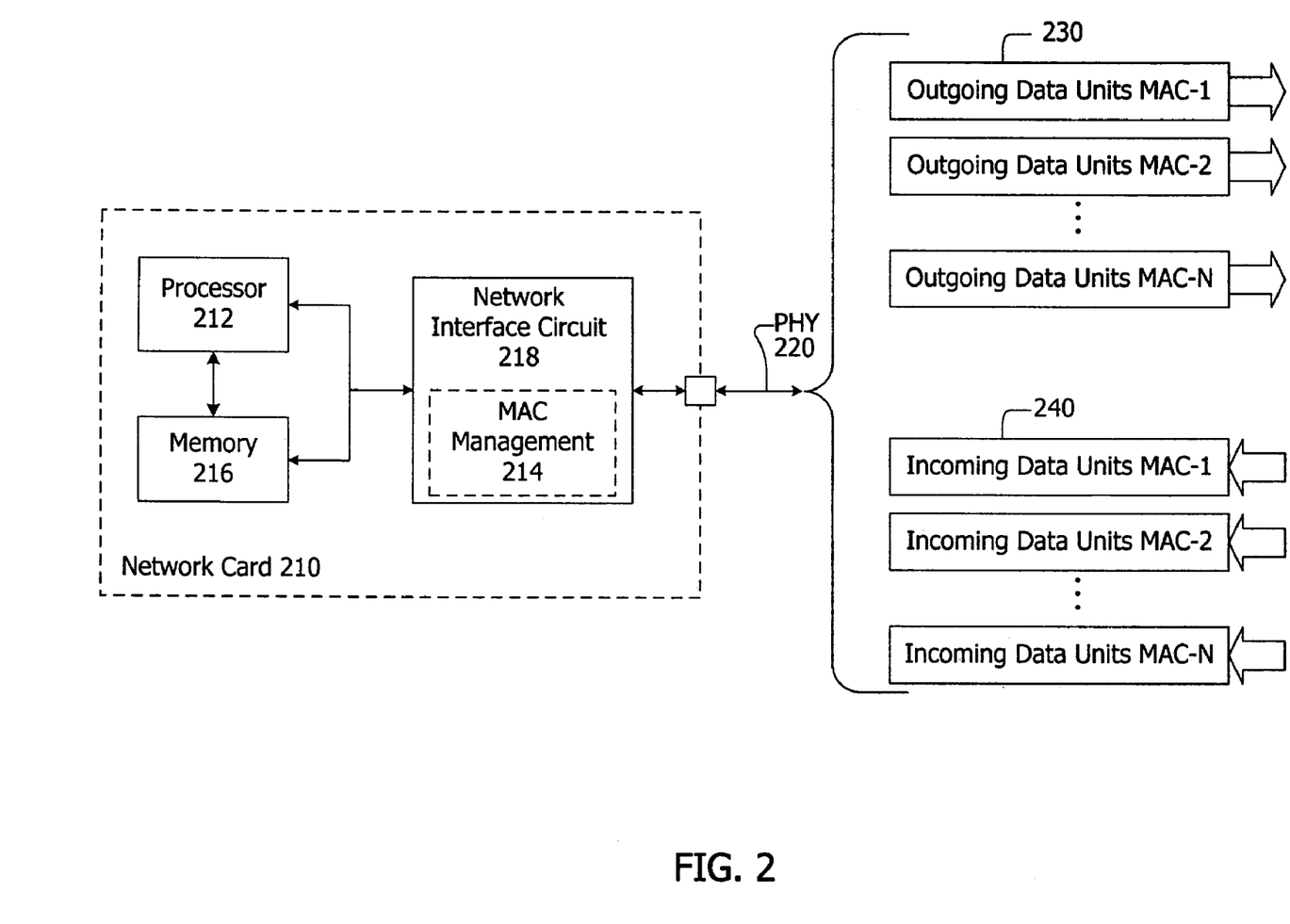
FIG. 2 is a block diagram of a network card according to one aspect of the invention.

Referring now to FIG. 2, there is shown a block diagram of a network card 210 according to one aspect of the invention. The network card 210 may be the network card 120 of FIG. 1. The network card 210 includes a processor 212, a memory 216 and a network interface circuit 218. The processor 212, memory 216 and network interface circuit 218 may be included on a single chip such as a FPGA, or may be a combination of multiple chips or devices. The network interface circuit 218 may have a MAC management module 214 incorporated therein, or an FPGA having a network interface circuit 218 may a MAC management module incorporated therein. Alternatively, the MAC management module 214 may be included as software on a hard disk drive or other machine readable medium (e.g., compact disk read-only memory, floppy disk) or flash memory device or other storage device (e.g. electronically erasable programmable read-only memory or EEPROM) which may be coupled to processor 212 and/or network interface circuit 218 via a bus or other coupling technique.

Processor 212 may be coupled to memory 216 and network interface circuit 218. Processor 212 may be any processor or processing device capable of executing instructions. Instructions include object code, assembly code, high-level computer language instructions, and other kinds of instructions. The instructions may be stored permanently or temporarily on network card 210. From outside the network card, the processor 212 may receive instructions such as patterns of traffic which the network card is to generate. The processor 212 may have an application program interface (API) for external control of the network card 210. A user may use a software program on a host to enter commands which create the instructions that are sent to the processor 212. The processor 212 may store the instructions in memory 216 before, after, and during their execution.

Memory 216 may be any memory device including random access memory (RAM). Additional memory devices may be included in network card 210. Other kinds of memory devices, such as, for example, flash memory and EEPROM, may be included in network card 210.

Network interface circuit 218 includes the software, firmware, and/or hardware that allows the network card 210 to communicate over a network via PHY 220. Network interface circuit 218 may be referred to as a port. There may be multiple ports on each network card 210. Each port/network interface circuit 218 may support one or more protocols that conform to the data link layer (DLL) requirement of the Open Systems Interconnection (OSI) reference model and/or the logical link control (LLC) and MAC layers of the IEEE 802 standards.

The MAC management module 214 may be software and/or firmware that allows multiple MAC addresses to be associated with the network interface circuit 218. An application program or other software program, module or subroutine may request that one or more MAC addresses be allocated to the network interface 218. This may be achieved by issuing a request to the MAC management module 214 of the network interface circuit via an API, by invoking a procedure call or subroutine, or by placing data in memory or register location on the network interface circuit and invoking an interrupt. The MAC management module 214 may maintain a MAC address table or other data structure to maintain a list of the MAC addresses allocated to and associated with the network interface 218. The MAC address table may be stored in memory 216, in a memory device on the FPGA, ASIC or other device on which the network interface circuit 218 is implemented.

The PHY 220 may be thick wire coaxial cable (such as RG-11), thin wire coaxial cable (such as RG-58), category (CAT) 3, 4 or 5 cable also known as Unshielded Twisted Pair (UTP), wireless, and others. The network interface circuit 218 and the PHY 220 may support Ethernet, Fast Ethernet, Gigabit Ethernet, IEEE 802 and/or other communications standards including, for example, without limitation, Asynchronous Transfer Mode (ATM), Fiber Distributed Data Interface (FDDI), token ring, 1000BaseT, 100BaseT, 10BaseT, 10BaseF, 10Base2, 10Base5, and others. Network 140 described above with regard to FIG. 1 also supports one or more of these standards.

According to the systems and methods described herein, network interface 218 may generate outgoing data units 230 from multiple MAC addresses over PHY 220. Network interface circuit 218 may receive incoming data units 240 addressed to multiple MAC addresses over PHY 220.

Figure 3:
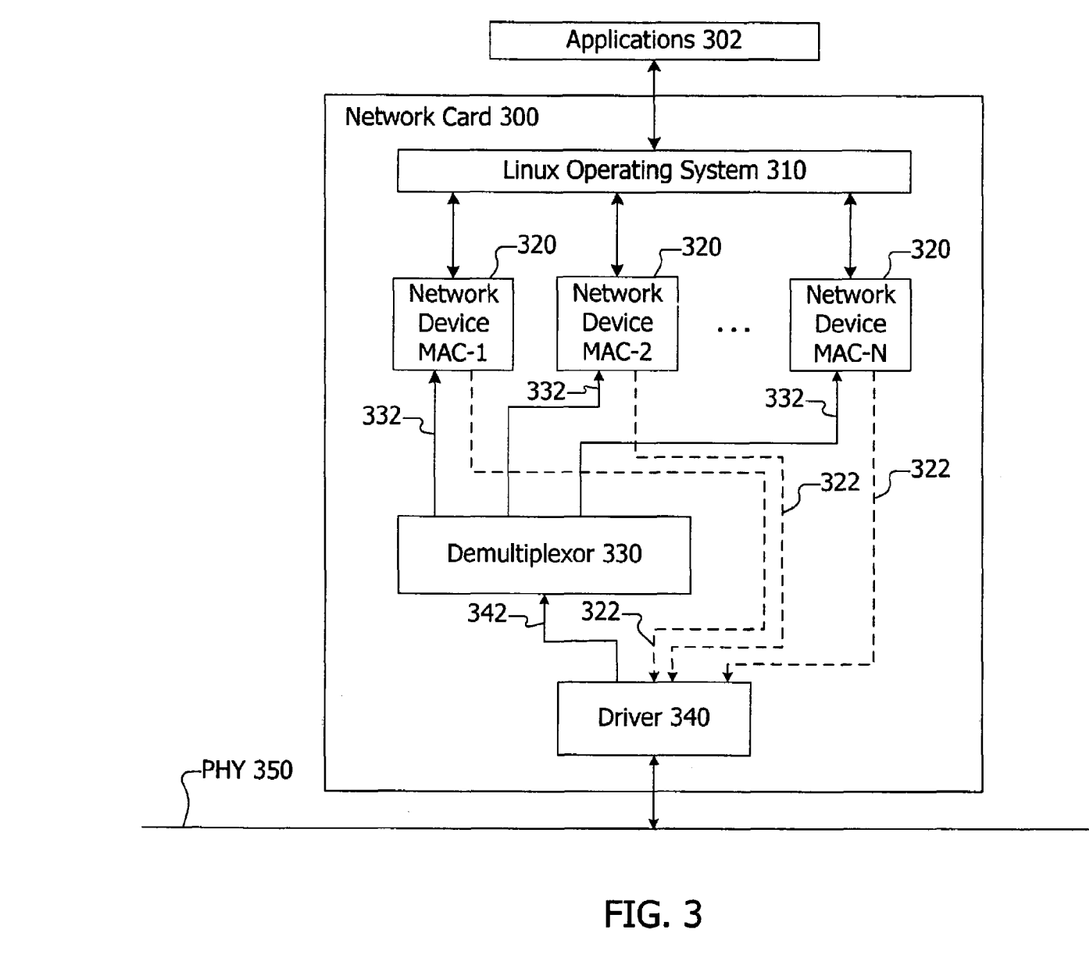
FIG. 3 is a block diagram of a network card according to another aspect of the invention.

Referring now to FIG. 3, there is shown a block diagram of network card 300 according to one aspect of the invention. The network card 300 may be the network card 120 of FIG. 1. Network card 300 may receive incoming data units and transmit outgoing data units over PHY 350. Network card 300 includes a media access control layer driver 340 which allows for communication over the particular kind of physical layer that is PHY 350. For example, driver 340 may support communication over one or more of coaxial cable, thin wire coaxial cable, CAT-5 cable/UTP, wireless, and others.

Demultiplexor 330 is included in network card 330. Demultiplexor 330 is virtually or logically coupled 342 to driver 340. Demultiplexor 330 receives incoming data units from driver 340. The incoming data units may be addressed to one or more MAC addresses. Demultiplexor 330 is logically or virtually coupled 332 to software network devices 320. Demultiplexor 330 passes or makes available incoming data units associated with each of different MAC addresses to each of the software network devices 320.

Software network devices 320 are devices created according to the Linux operating system 310 or other operating system. In Linux or versions of the Unix operating system an IOCTL call may be used to create/access the software network devices. Each of the software network devices 320 is associated with a different MAC address.

Driver 340 binds or maps each MAC address to a corresponding software network device. Driver 340 may maintain MAC address table in the form of a database, list or other data structure associating MAC addresses with network devices. This MAC address list may be accessed when an IOCTL, API or other subroutine or procedure is used to access and/or create a MAC address/network software device.

Software network devices 320 pass or make available incoming data units to network layer, session layer, presentation layer, and application layer software programs via the Linux operating system 310. The session layer and/or network layer software programs may be included in the Linux operating system 310. The network layer included in the Linux operating system may support, for example, the transmission control protocol (TCP), the internet protocol (IP), the user datagram protocol (UDP) protocols and/or other protocols. Sockets or other API provided by an operating system such as Linux 310 may be used by upper layers and application programs 302 to access the software network devices 320. In this way, application programs and other upper layer software may access the software network devices 320 having the virtual MAC addresses in the same manner as the application programs access traditional network devices.

Outgoing data units from each of different MAC addresses may be created and sent based on instructions received from an application layer program 302 external to the network card 300 and above the Linux operating system 310. In other embodiments, the application program 302 may be included in the network card, and/or multiple application programs 302 may be included both external to the network card 300 and in the network card 300. The application program 302 may specify that data units be sent from a particular source MAC address by accessing the appropriate software network device 320. Software network devices 320 receive information and/or instructions to create and/or send data units from one or more application programs 302 or other upper layer programs via the Linux operating system 310. Each of software network devices 320 is logically or virtually coupled 322 to driver 340. Outgoing data units initiated by a network layer program, an application program or other upper layer program are transmitted by a network device 320 via driver 340 over PHY 350.

As set forth in the preceding paragraphs, the software network devices 320, in combination with supporting components, may each serve as a virtual NIC and/or network node. In this way, an application program may use a single network card to emulate multiple virtual NICs, each having a distinct MAC address. The MAC addresses may be created randomly and/or sequentially. The MAC addresses may include the device or system manufacturer's Organizationally Unique Identifier (OUI) and a sequentially or randomly selected organizationally unique address (OUA). The testing system may allow a user to select OUIs and OUAs manually. The testing system may allow a user to select whether the OUI and/or the OUA should be created randomly or sequentially.

Methods of the Invention

Figure 4:
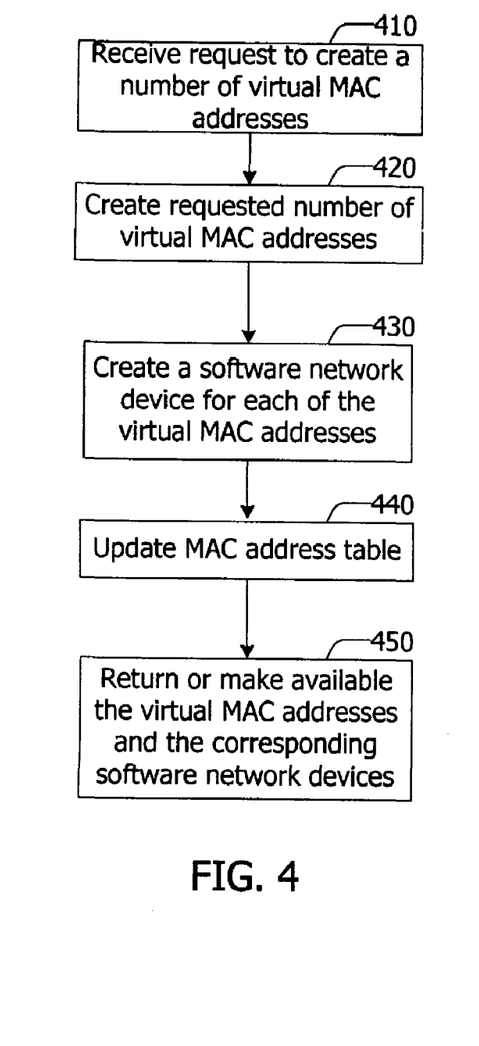
FIG. 4 is a flowchart of the actions taken to create multiple virtual MAC addresses according to one aspect of the invention.

Referring now to FIG. 4, there is shown a flowchart of the actions taken to create multiple virtual MAC addresses according to one aspect of the invention. A request to create a number of virtual MAC addresses is received, as shown in block 410. This request may be made by an application program such as a network testing program, a network traffic generating program, and others. This request may be made by using a procedure call, may be achieved by placing data in registers of a processor and invoking an interrupt, and by other techniques. The request may specify to create one or more software network devices having a specified MAC address, a random MAC address, or a partially specified and partially random MAC address. The network testing program or other application may designate specific MAC addresses or portions thereof, may specify numerical boundaries within which the MAC addresses should be randomly and/or sequentially created, and/or may request that one or more OUIs and the OUAs of the MAC addresses be randomly and/or sequentially created.

The requested number of virtual MAC addresses is created, as shown in block 420. A software network device for each of the virtual MAC addresses may be created, as shown in block 430. This may be achieved using Linux device creation techniques, such as, for example, an IOCTL call. A MAC address table that lists the MAC addresses and corresponding software network devices is updated, as shown in block 440.

The virtual MAC addresses and the corresponding software network devices are returned or made available, as shown in block 450. This may be achieved by passing a pointer to the software network device that is recognizable by the operating system, returning an identifier of the software network device that is recognized by the operating system, and by other techniques. The identifier may be a text string, a number, a combination thereof, or any identifier.

Figure 5:
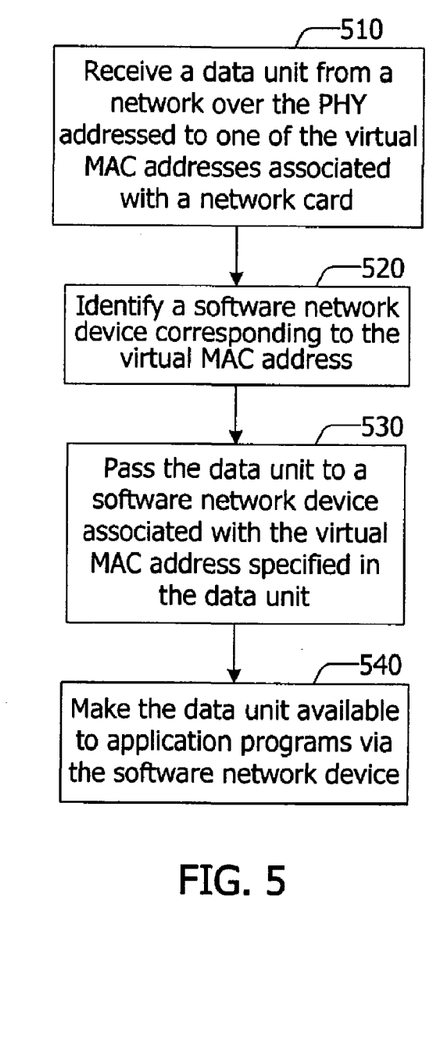
FIG. 5 is a flowchart of the actions taken to receive a data unit addressed to one of the multiple virtual MAC addresses according to one aspect of the invention.

Referring now to FIG. 5, there is shown a flowchart of the actions taken to receive a data unit addressed to one of the multiple virtual MAC addresses according to one aspect of the invention. A data unit addressed to one of the virtual MAC addresses associated with a network card may be received from a network over the PHY, as shown in block 510. A MAC address table may referenced to identify a corresponding software network device, as shown in block 520. The data unit may be passed to the software network device associated with the virtual MAC addresses specified in the data unit, as shown in block 530. The data unit is made accessible to application programs via the software network device, as shown in block 540. The data unit may then be accessed by an application program via an IOCTL call to the software network device, a socket, pending on a queue associated with the software network device, an API, or other techniques.

Figure 6:
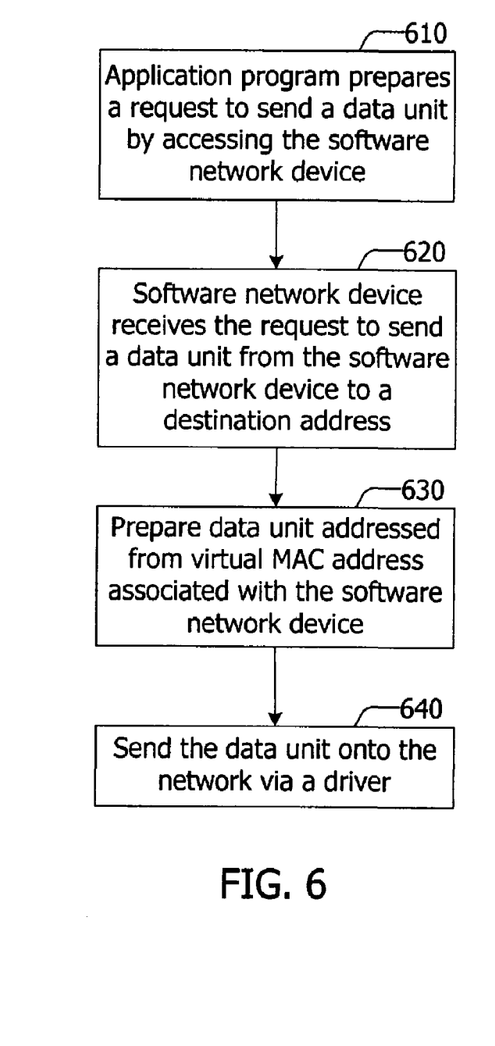
FIG. 6 is a flowchart of the actions taken to send a data unit from one of the multiple virtual MAC addresses according to one aspect of the invention.

Referring now to FIG. 6, there is shown a flowchart of the actions taken to send a data unit from one of the multiple virtual MAC addresses according to one aspect of the invention. An application program prepares a request to send a data unit by accessing a software network device, as shown in block 610. This may be achieved by using a Linux interface to the software network device via a procedure call. The procedure call may provide access to a socket or other API associated with the software network device. This may also be achieved by placing data in registers of a processor and invoking an interrupt, and by other techniques. A software network device receives the request to send a data unit from the software network device to a destination address, as shown in block 620. A data unit addressed from the virtual MAC address associated with software network device is prepared, as shown in block 630. The data unit is sent onto the network via a driver, as shown in block 620.

According to the methods described in FIGS. 4, 5 and 6, an application program and/or a user may access the multiple MAC addresses of a single network card to receive, emulate and/or generate a plurality of data units to evaluate the performance of one or more DUTs. In this way, a single network card employing the methods described herein may replace multiple traditional hardware NICs.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

The invention claimed is:

1. A network card comprising:
   a processor
   a memory coupled to the processor
   a network interface circuit coupled to the processor and the memory, the network interface circuit to couple to a physical layer of a network
   instructions, stored in the memory, which when executed by the processor cause the network card to perform operations including
      receiving a request to create a plurality of software network devices conforming to at least one of a data link layer (DLL) of the Open Systems Interconnection (OSI) reference model, a logical link control (LLC) layer of an IEEE 802 standard and/or a media access control (MAC) layer of the IEEE 802 standard
      creating the plurality of software network devices, wherein the creating includes allocating a plurality of media access control (MAC) addresses to the network interface circuit, each of the MAC addresses corresponding to one of the software network devices.

2. The network card of claim 1 having further instructions which cause the network card to perform actions comprising:
   receiving over the network a data unit addressed to one of the MAC addresses associated with the network card.

3. The network card of claim 2 wherein the receiving over the network further comprises passing the data unit to the software network device associated with the MAC address specified in the data unit.

4. The network card of claim 1 wherein the software network device comprises an identifier recognizable by an operating system as referring to a particular virtual network device.

5. The network card of claim 1 wherein the software network device comprises a virtual network device recognized by an operating system and identified by an identifier.

6. The network card of claim 1 having further instructions which cause the network card to perform actions comprising:
   receiving a request to send an outgoing data unit from a specified MAC address of the plurality of MAC addresses to a destination address
   transmitting over the network the outgoing data unit to the specified MAC address.

7. The network card of claim 6 further comprising a software network device for each of the plurality of MAC addresses, and the receiving operation comprises receiving via a software network device associated with the specified MAC address the request to send the outgoing data unit.

8. A network testing system comprising a backplane and a plurality of network cards coupled with the backplane, wherein at least one of the plurality of network cards includes the network card of claim 1.

9. A network having a network testing system coupled thereto, wherein the network testing system comprises a backplane and a plurality of network cards coupled with the backplane, wherein the plurality of network cards includes at least one network card of claim 1.

10. A method in a network card comprising:
    receiving a request from a requestor to create a requestor specified plurality of software network devices for the network card, the software network devices having a corresponding plurality of media access control (MAC) addresses and conforming to at least one of a data link layer (DLL) of the Open Systems Interconnection (OSI) reference model, a logical link control (LLC) layer of an IEEE 802 standard and/or a media access control (MAC) layer of the IEEE 802 standard
    creating the plurality of software network devices, wherein the creating includes allocating a plurality of media access control (MAC) addresses to the software network devices of the network card.

11. The method of claim 10 wherein the creating further comprises:
    allocating one of the plurality of MAC addresses for each of the plurality of software network devices.

12. The method of claim 10 further comprising:
    receiving over the network a data unit addressed to one of the MAC addresses associated with the network card.

13. The method of claim 12 further comprising creating a software network device for and corresponding to each of the plurality of MAC addresses, and the receiving step further comprises passing the data unit to the software network device corresponding to the MAC address specified in the data unit.

14. The method of claim 10 further comprising:
    receiving a request to send an outgoing data unit from a specified MAC address of the plurality of MAC addresses to a destination address
    transmitting the outgoing data unit over the network from the specified MAC address.

15. The method of claim 14 further comprising creating a software network device for each of the plurality of MAC addresses, and the receiving step comprises receiving via the software network device associated with the specified MAC address the request to send the outgoing data unit.

16. A network card comprising:
    a driver to send data units onto and receive data units from a network
    a plurality of application program specified software network devices conforming to at least one of a data link layer (DLL) of the Open Systems Interconnection (OSI) reference model, a logical link control (LLC) layer of an IEEE 802 standard and/or a media access control (MAC) layer of the IEEE 802 standard, the software network devices each having a corresponding MAC address, the software network devices to send outgoing data units onto the network using the driver, the software network devices specifying the corresponding MAC addresses as source addresses
    a demultiplexor to receive incoming data units from the driver and to distribute the incoming data units to software network devices corresponding to destination addresses specified in the incoming data unit.

17. The network card of claim 16 further comprising:
an operating system through which one or more application programs may access the network devices to send data units and to receive data units.

18. The network card of claim 17 wherein the application program resides on the network card.

19. The network card of claim 16 wherein the network is an Ethernet network.

20. The network card of claim 16 further comprising a processor and a memory.

21. A network card comprising:
a driver to send data units onto and receive data units from a network
a demultiplexor to receive incoming data units from the driver and to distribute the incoming data units to a plurality of software network devices corresponding to destination addresses specified in the incoming data unit, the software network devices conforming to at least one of a data link layer (DLL) of the Open Systems Interconnection (OSI) reference model, a logical link control (LLC) layer of an IEEE 802 standard and a media access control (MAC) layer of the IEEE 802 standard
a management module to create the plurality of software network devices upon request, each software network device having a corresponding MAC address, the software network devices to send outgoing data units onto the network using the driver, the software network devices specifying the corresponding MAC addresses as source addresses, the software network devices receiving incoming data units from the demultiplexor.

22. A method performed by a single network card, the method comprising:
receiving a request from a requestor to create a plurality of requestor specified software network devices associated with the network card
creating the plurality of requestor specified software network devices for the network card, each of the software network devices having a corresponding plurality of media access control (MAC) addresses and conforming to at least one of a data link layer (DLL) of the Open Systems Interconnection (OSI) reference model, a logical link control (LLC) layer of an IEEE 802 standard and a media access control (MAC) layer of the IEEE 802 standard, wherein the creating includes assigning an identifier to each of the plurality of software network devices
allocating the plurality of MAC addresses to a network interface circuit included on the network card
providing to the requestor the plurality of MAC addresses and the identifiers for the plurality of software network devices.

23. The method of claim 22 wherein the request includes a number of software network devices to be created and a designation whether the MAC addresses are requestor provided or should be generated.

24. The method of claim 23 wherein the MAC addresses include an organizationally unique identifier (OUI) and an organizationally unique address (OUA), and the designation includes whether the OUI is requestor provided or should be generated, and whether the OUA is requestor provided or should be generated.

25. The method of claim 23 wherein the designation includes whether the MAC addresses should be randomly or sequentially generated.

26. The method of claim 22 further comprising:
receiving over the network incoming data units addressed to the MAC addresses allocated to the network interface circuit
passing the incoming data units to software network devices corresponding to destination MAC addresses specified in the incoming data units.

27. The method of claim 26 wherein the passing further comprises:
referring to a MAC address table to determine which software network devices correspond to the destination MAC addresses specified in the incoming data units.

28. The method of claim 26 wherein the receiving is achieved using a socket interface provided by an operating system.

29. The method of claim 22 further comprising:
receiving via the software network devices requests to send outgoing data units to one or more destination address from one or more MAC addresses corresponding to the software network devices
transmitting the outgoing data units over the network to the destination addresses.

30. The method of claim 29 wherein the transmitting further comprises:
referring to a MAC address table to determine which destination MAC addresses correspond to the software network devices that received the requests.

31. The method of claim 22 wherein the allocating further comprises:
updating a MAC address table that includes a list of MAC addresses and corresponding network software device identifiers.

* * * * *